United States Patent
Aoki et al.

(10) Patent No.: US 10,957,263 B2
(45) Date of Patent: *Mar. 23, 2021

(54) DISPLAY DEVICE HAVING BACKLIGHT

(71) Applicant: Japan Display Inc., Tokyo (JP)

(72) Inventors: Shigenori Aoki, Tokyo (JP); Tatsuya Yata, Tokyo (JP); Tsutomu Harada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,622

(22) Filed: Jan. 9, 2020

(65) Prior Publication Data

US 2020/0152139 A1    May 14, 2020

Related U.S. Application Data

(63) Continuation of application No. 15/598,552, filed on May 18, 2017, now Pat. No. 10,573,252.

(30) Foreign Application Priority Data

May 18, 2016  (JP) ................................ 2016-099879

(51) Int. Cl.
G09G 3/34        (2006.01)
G02F 1/13357     (2006.01)
G09G 3/36        (2006.01)

(52) U.S. Cl.
CPC ..... *G09G 3/3426* (2013.01); *G02F 1/133606* (2013.01); *G02F 1/133611* (2013.01);
(Continued)

(58) Field of Classification Search
CPC .............................................. G02F 1/133606
See application file for complete search history.

(56) References Cited

U.S. PATENT DOCUMENTS 8,434,887 B2   5/2013  Seetzen et al.
8,743,156 B2   6/2014  Higashi et al.
(Continued)

FOREIGN PATENT DOCUMENTS

JP    2001-281656      10/2001
JP    2004-134322 A     4/2004
(Continued)

OTHER PUBLICATIONS

Japanese Office Action issued in related Japanese Patent Application No. 2016-099879 dated Oct. 29, 2019 and English translation of same. 12 pages.

(Continued)

*Primary Examiner* — Gustavo Polo
(74) *Attorney, Agent, or Firm* — K&L Gates LLP

(57) ABSTRACT

According to one embodiment, a display device includes a display panel including a first sub display area and a second sub display area, and an illumination device, wherein the illumination device includes a first light source opposed to the first sub display area, a second light source opposed to the second sub display area, and a partition positioned between the first and second light sources and the display panel, and the partition includes a first side surface surrounding the first light source, a second side surface surrounding the second light source, and a connector which connects the first side surface and the second side surface, and the connector is formed of curved surfaces, or two or more flat surfaces, or a combination of curved surfaces and flat surfaces.

12 Claims, 17 Drawing Sheets

(52) U.S. Cl.
CPC ...... *G09G 3/3611* (2013.01); *G02F 1/133603* (2013.01); *G02F 1/133605* (2013.01); *G02F 2201/08* (2013.01); *G09G 2300/0452* (2013.01); *G09G 2310/08* (2013.01); *G09G 2320/0233* (2013.01); *G09G 2320/0646* (2013.01)

(56) References Cited

U.S. PATENT DOCUMENTS

| | | |
|---|---|---|
| 10,573,252 B2 * | 2/2020 | Aoki .................... G09G 3/3611 |
| 2006/0215075 A1 | 9/2006 | Huang et al. |
| 2006/0290840 A1 | 12/2006 | Bang et al. |
| 2010/0321610 A1 * | 12/2010 | Tanaka .............. G02F 1/133606 349/62 |
| 2013/0070165 A1 | 3/2013 | Shimizu |

FOREIGN PATENT DOCUMENTS

| | | |
|---|---|---|
| JP | 2005-001506 | 6/2005 |
| JP | 2010-135204 | 6/2010 |
| JP | 2011-090949 | 5/2011 |
| JP | 2012-212509 A | 11/2012 |
| KR | 10-2007-025727 | 3/2007 |
| KR | 10-2013-036447 | 4/2013 |

OTHER PUBLICATIONS

Machine translation of Japanese Office Action for related Japanese Patent Application No. 2016-099879 dated Mar. 3, 2020. 7 pages.

* cited by examiner

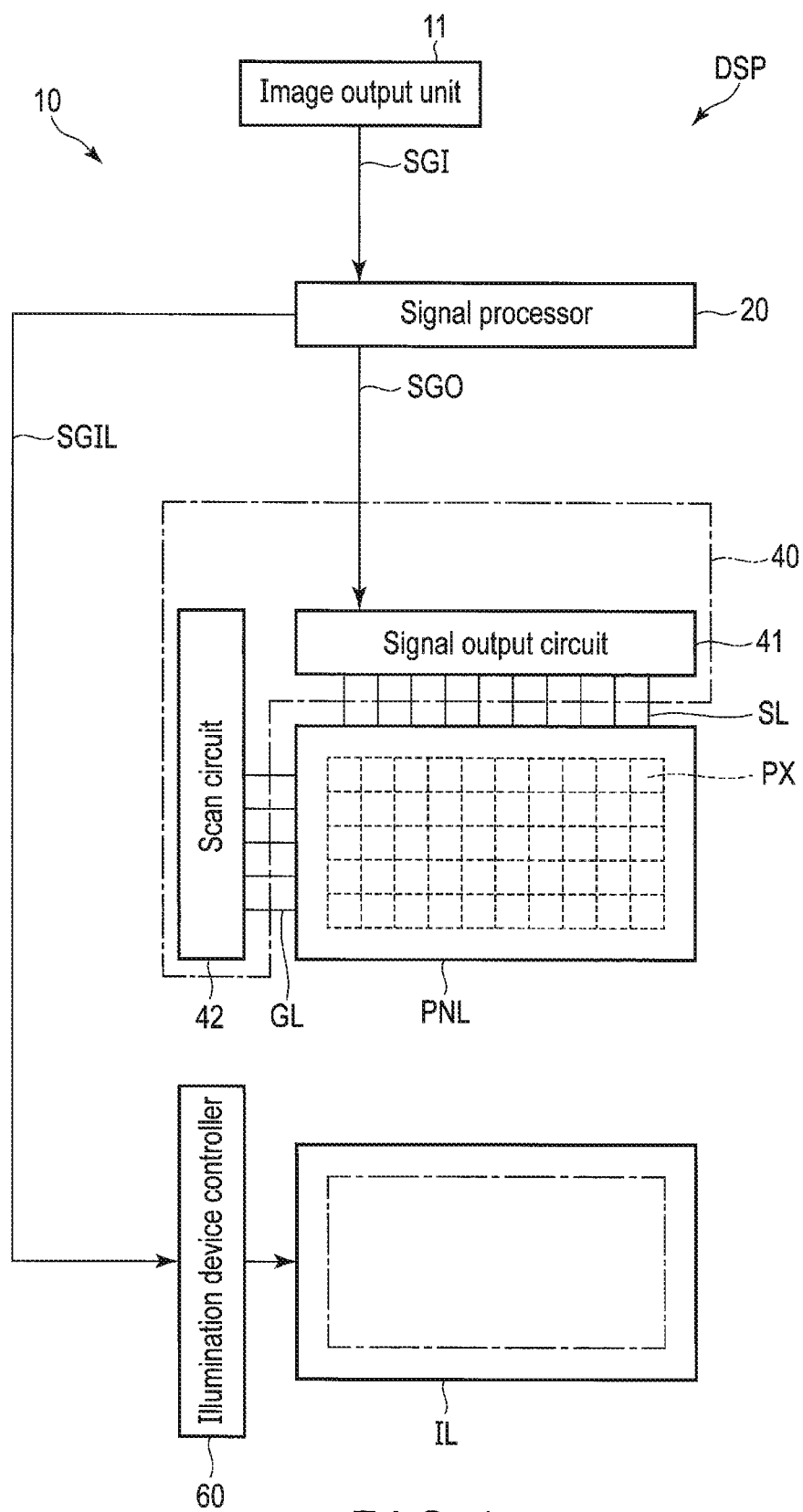
F I G. 1

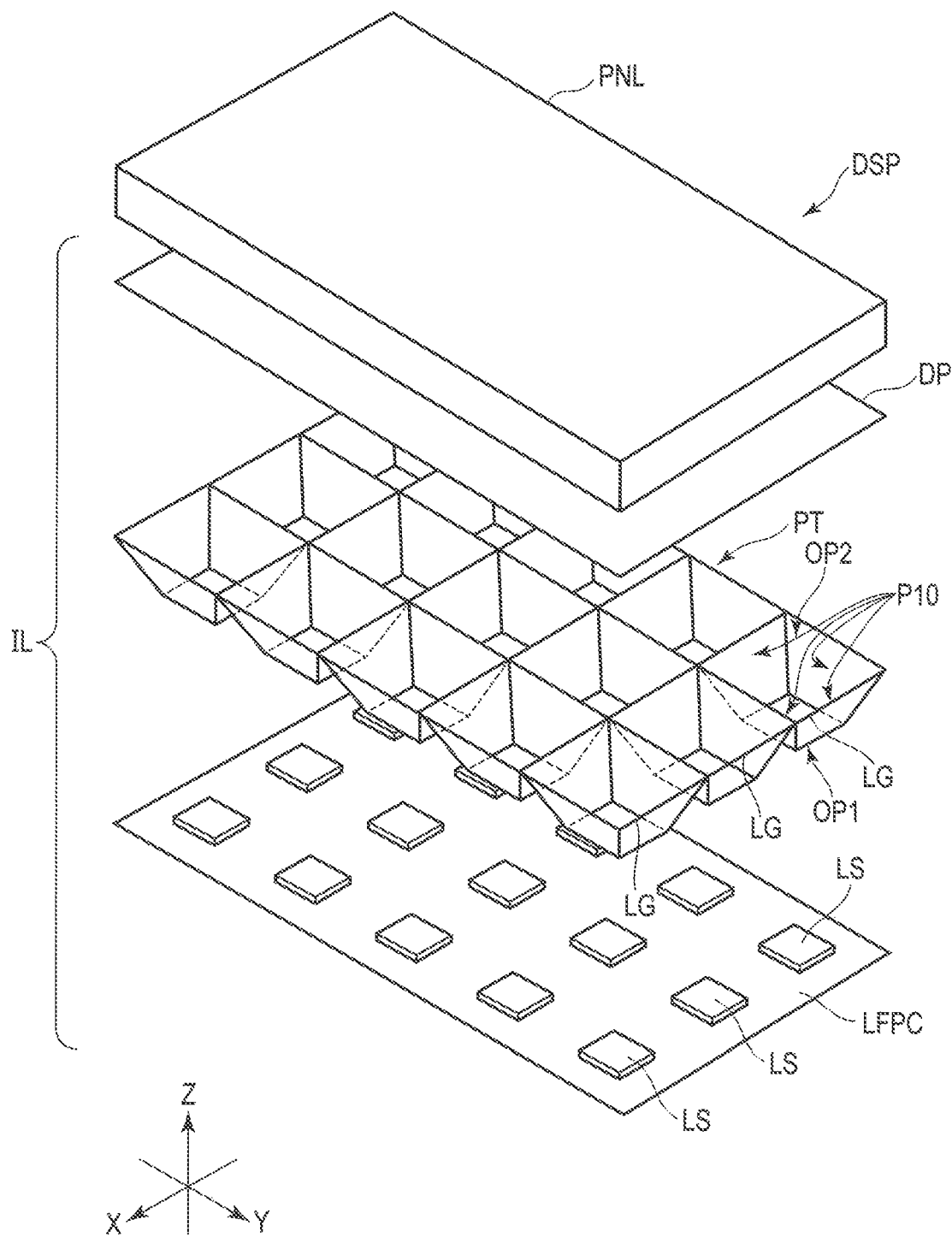
F I G. 4

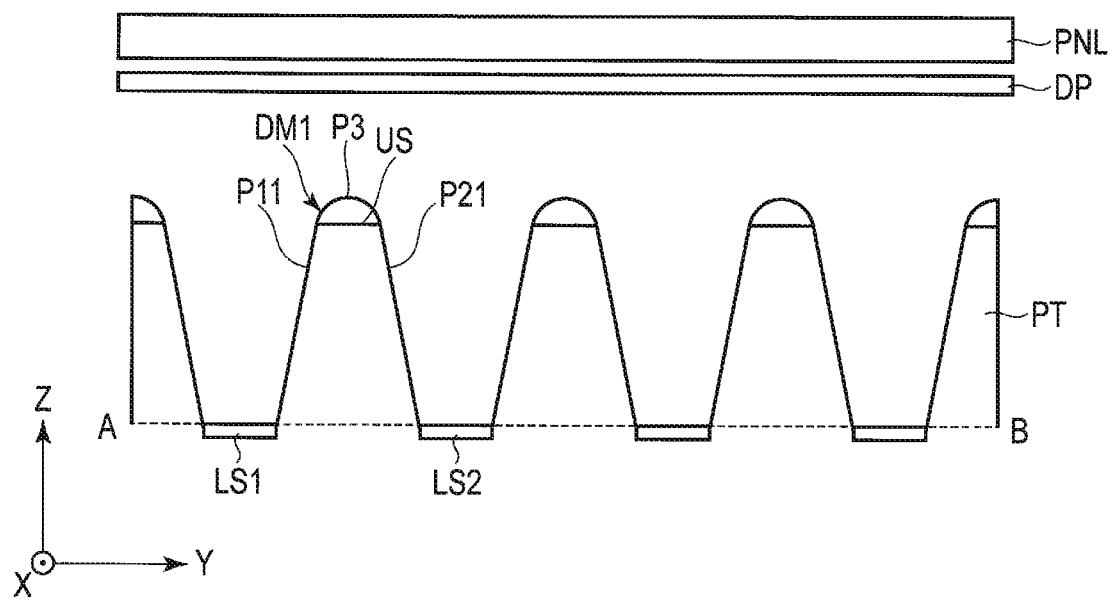
F I G. 11

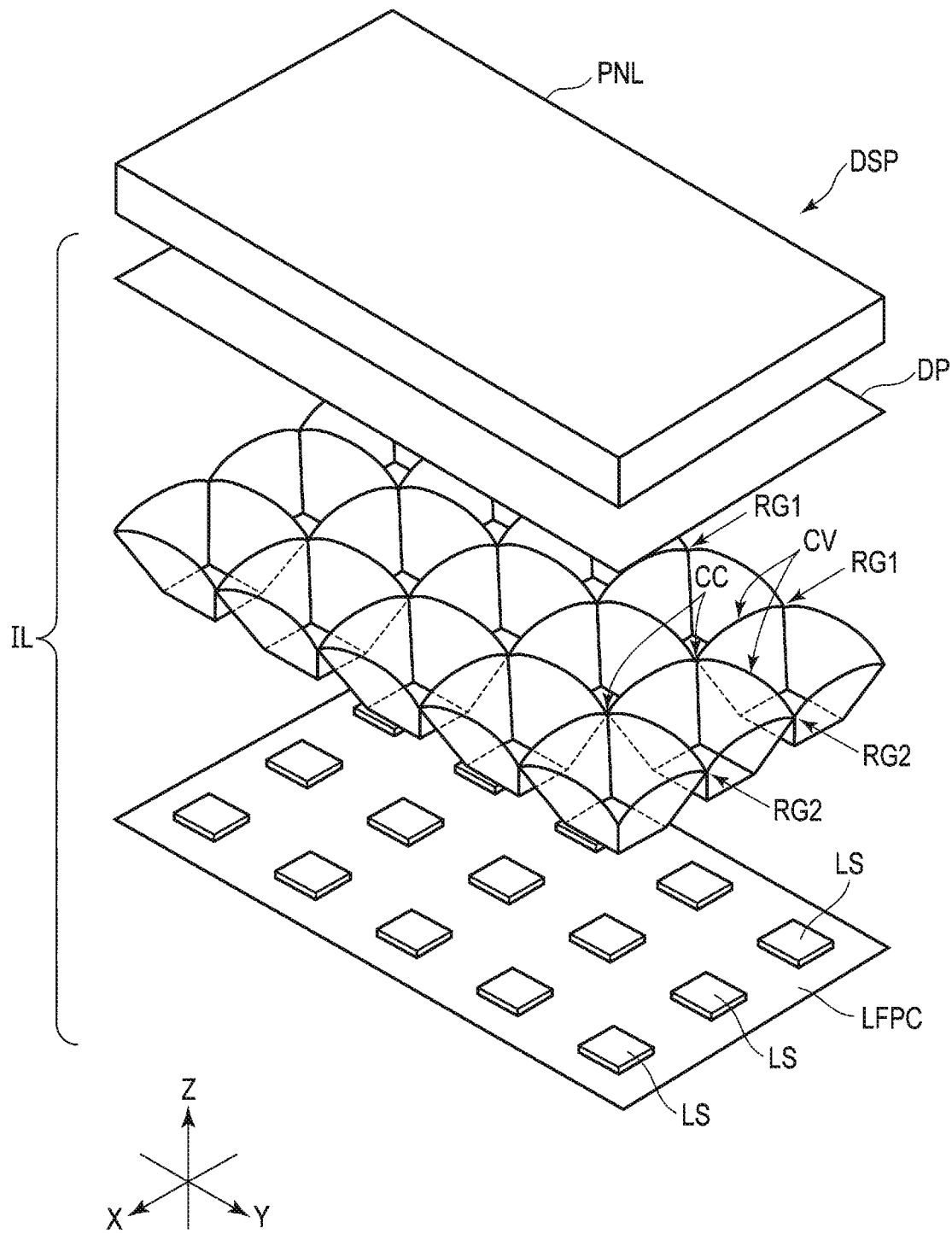
F I G. 12

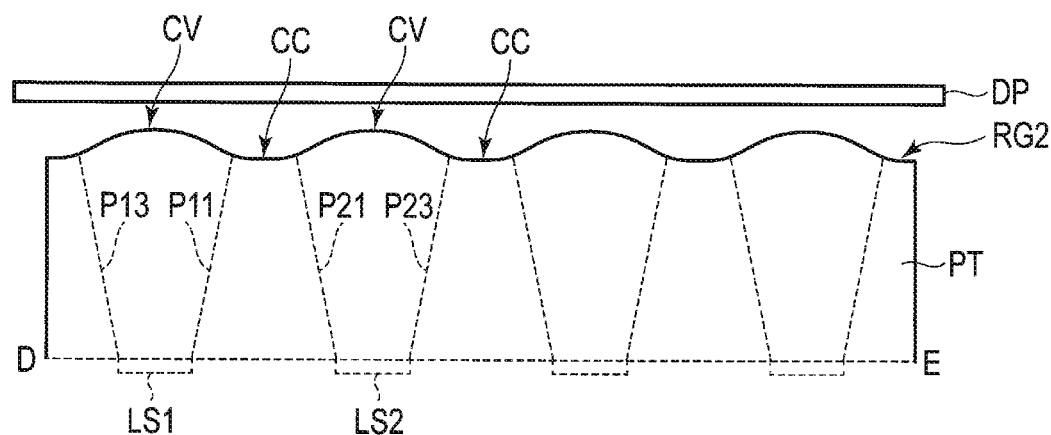
F I G. 13
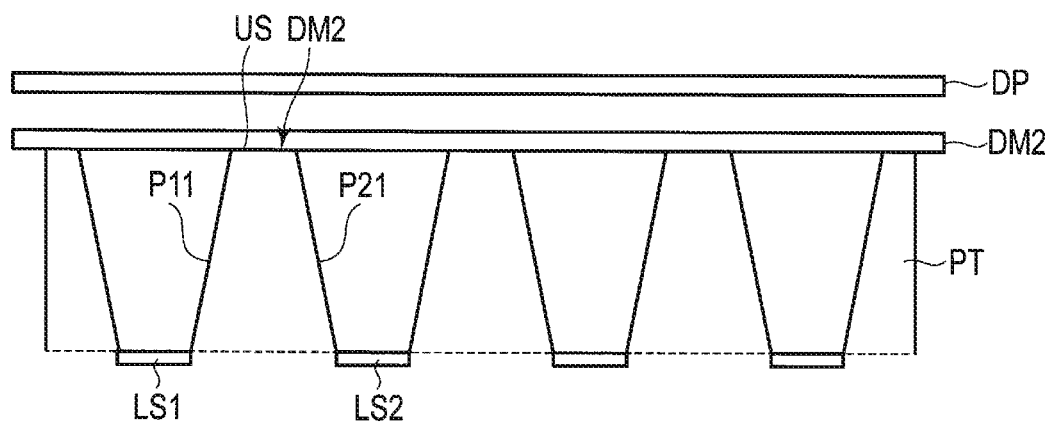
F I G. 14

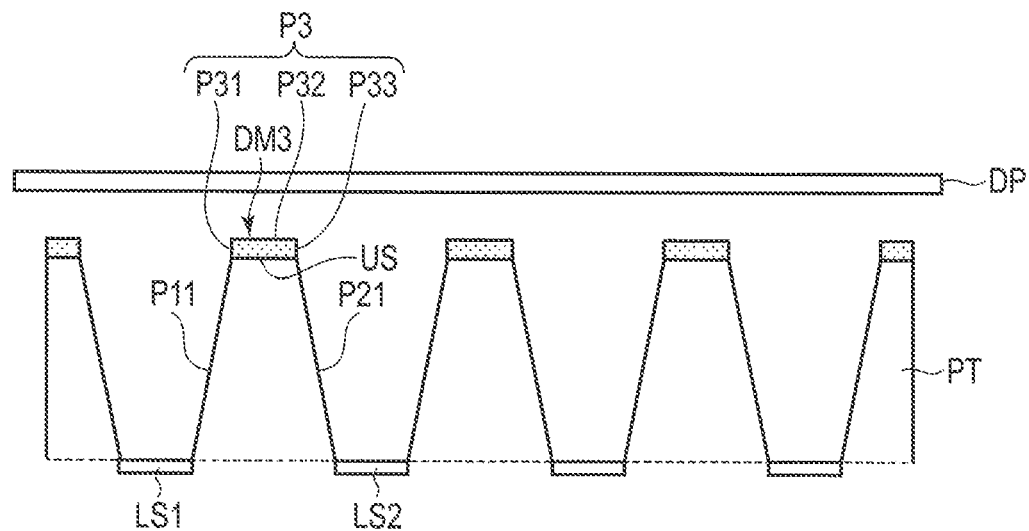
F I G. 15
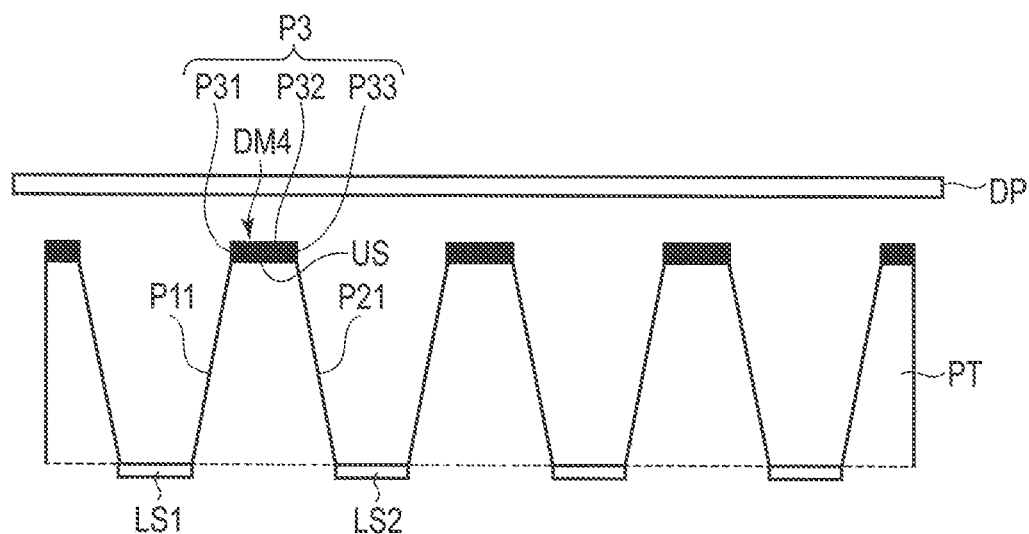
F I G. 16

DISPLAY DEVICE HAVING BACKLIGHT

CROSS-REFERENCE TO RELATED APPLICATIONS

This application is a continuation of U.S. patent application Ser. No. 15/598,552, filed on May 18, 2017, which application is based upon and claims the benefit of priority from Japanese Patent Application No. 2016-099879, filed May 18, 2016, the entire contents of which are incorporated herein by reference.

FIELD

Embodiments described herein relate generally to a display device.

BACKGROUND

As a kind of display devices, there is a commercially utilized structure including a liquid crystal display panel and a backlight with light sources disposed immediately below thereof. There is a proposed technique that, when adjacent light sources in a backlight are all turned on, the total strength of the light is made substantially even. Furthermore, there is another proposed technique that, when an image displayed in a head-up display, a range of the displayed image is recognized to turn on light sources corresponding to the range in order to reduce the power and to suppress heating. Furthermore, there is another proposed technique that a direct backlight has step pyramid holes in a holder tapered from the light emitting element side to the light emitting surface in order to reduce unevenness in the brightness. The direct backlight is also called straight fall type backlight.

When a light source array in which light sources are arranged at certain intervals is driven, it is required to reduce unevenness in the brightness caused by a dim line with low brightness and a bright line with high brightness. Furthermore, a display device including such an illumination device is required to suppress deterioration of display quality caused by such unevenness in the brightness of the illumination device.

SUMMARY

The present disclosure generally relates to a display device.

According to an embodiment, a display device includes a display panel including a first sub display area and a second sub display area, and an illumination device, wherein the illumination device includes a first light source opposed to the first sub display area, a second light source opposed to the second sub display area, and a partition positioned between the first and second light sources and the display panel, and the partition includes a first side surface surrounding the first light source, a second side surface surrounding the second light source, and a connector which connects the first side surface and the second side surface, and the connector is formed of curved surfaces, or two or more flat surfaces, or a combination of curved surfaces and flat surfaces.

Additional features and advantages are described herein, and will be apparent from the following Detailed Description and the figures.

BRIEF DESCRIPTION OF THE DRAWINGS

FIG. 1 is a block diagram showing the structure of a display device of an embodiment.

FIG. 4 is a perspective view of the display device of the embodiment in a disassembled manner.

FIG. 11 is a cross-sectional view of another example of the structure of the partition, taken along line A-B of FIG. 5.

FIG. 12 is a perspective view of another example of the structure of the partition in a disassembled manner.

FIG. 13 is a cross-sectional view of an example of the structure of the partition, taken along line D-E of FIG. 5.

FIG. 14 is a cross-sectional view of another example of the structure of the partition, taken along line A-B of FIG. 5.

FIG. 15 is a cross-sectional view of another example of the structure of the partition, taken along line A-B of FIG. 5.

FIG. 16 is a cross-sectional view of another example of the structure of the partition, taken along line A-B of FIG. 5.

DETAILED DESCRIPTION

Figure 2:
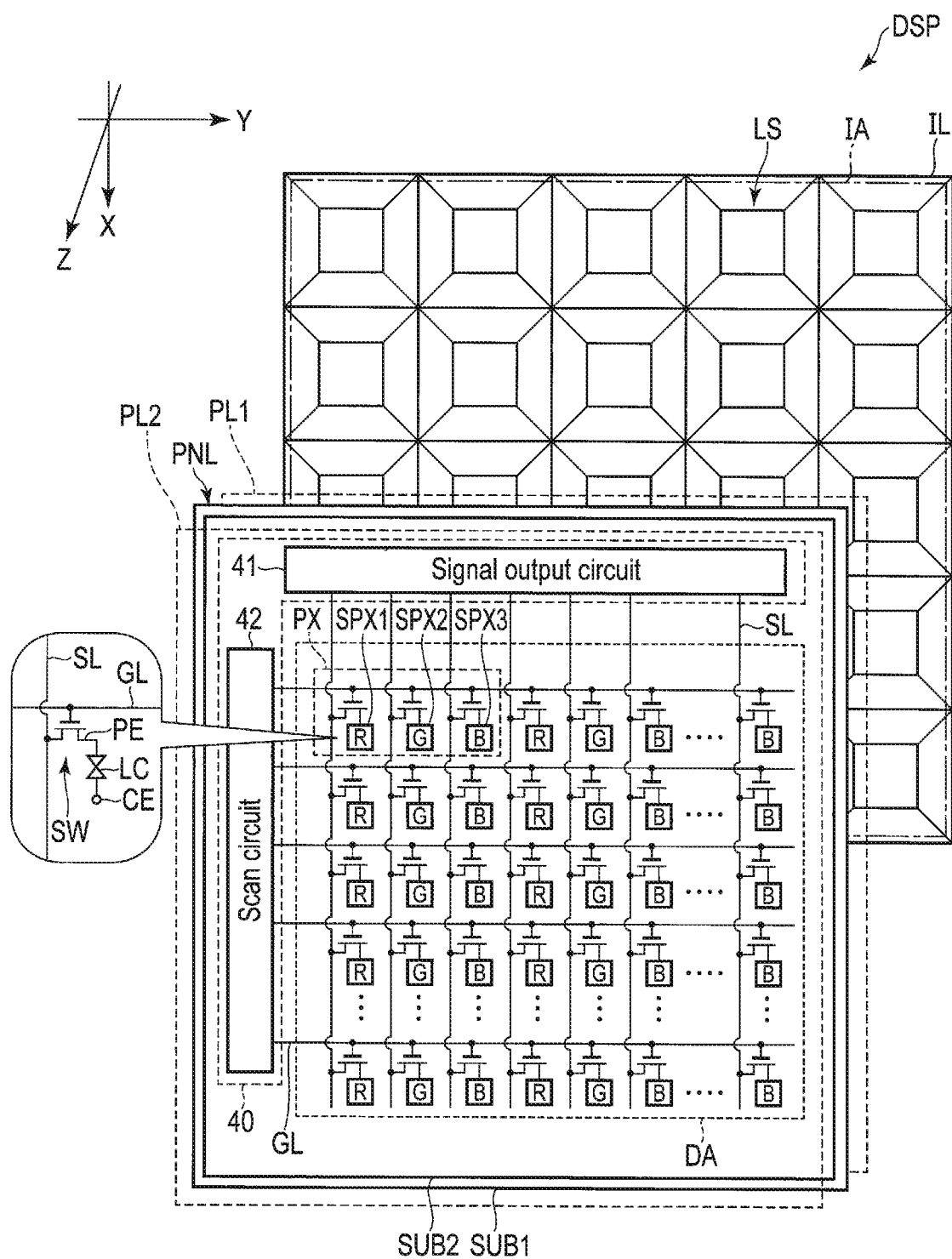
FIG. 2 shows an example of the structure of an illumination device and a display panel applicable to the embodiment.

In general, according to one embodiment, a display device comprising: a display panel including a first sub display area and a second sub display area; and an illumination device which illuminates the display panel, wherein the illumination device includes a first light source opposed to the first sub display area, a second light source opposed to the second sub display area, and a partition positioned between the first and second light sources and the display panel, and the partition includes a first side surface surrounding the first light source, a second side surface surrounding the second light source, and a connector which connects the first side surface and the second side surface, and the connector is formed of curved surfaces, or two or more flat surfaces, or a combination of curved surfaces and flat surfaces.

In general, according to one embodiment, a display device comprising: a display panel including a first sub display area and a second sub display area; and an illumination device which illuminates the display panel, wherein the illumination device includes a first light source opposed to the first sub display area, a second light source opposed to the second sub display area, and a partition positioned between the first and second light source and the display panel, and the partition includes a side surface surrounding the first light source and the second light source, respectively, and an upper surface opposed to the display panel, and an optical adjustor which is positioned on the upper surface to diffuse or absorb light.

In general, according to one embodiment, a display device comprising: a display panel including a first sub display area and a second sub display area; and an illumination device which illuminates the display panel, wherein the illumination device includes a first light source opposed to the first sub display area, a second light source opposed to the second sub display area, and a partition positioned between the first and second light source and the display panel, and the partition includes a first ridge and a third ridge extending in a first direction and a second ridge extending in a second direction to cross the first ridge and the third ridge in a plan view, and recesses positioned at a first crossing point of the first ridge and the second ridge and a second crossing point of the third ridge and the second ridge, and a projection positioned between the first crossing point and the second crossing point.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless necessary.

Initially, a display device of an embodiment will be explained.

FIG. 1 is a block diagram showing a display device DSP of the present embodiment.

As in FIG. 1, the display device DSP includes a controller 10, display panel PNL, and illumination device IL which illuminates the display panel PNL. The controller 10 includes a signal processor 20, display panel driver 40 which controls the drive of display panel PNL, and illumination device controller 60 which controls the drive of illumination device IL.

The signal processor 20 receives an input signal SGI of an image from an image output unit 11, sends an output signal SGO to each unit in the display device DSP to control the operation of the display device DSP. The signal processor 20 is connected to the display panel driver 40 and the illumination device controller 60. Here, the signal processor 20 corresponds to a processor to control the operation of the display panel PNL and the illumination device IL. The signal processor 20 processes the input signal SGI and generates the output signal SGO and illumination device control signal SGIL. The signal processor 20 outputs the output signal SGO to the display panel driver 40 and outputs the illumination device control signal SGIL to the illumination device controller 60.

The display panel PNL displays an image based on the output signal SGO from the signal processor 20. The display panel PNL includes a plurality of pixels PX arranged in a matrix. As will be described later, each pixel PX includes several subpixels each of which includes a switching element and the like.

The display panel driver 40 includes a signal output circuit 41 and a scan circuit 42. The signal output circuit 41 is electrically connected to the display panel PNL through a signal line SL. The scan circuit 42 is electrically connected to the display panel PNL through a scan line GL. The display panel driver 40 maintains an image signal with the signal output circuit 41 and sequentially outputs the image signal to the display panel PNL. Furthermore, the display panel driver 40 selects subpixels in the display panel PNL with the scan circuit 42 and controls on/off of switching elements to control the operation (light transmissivity) of the subpixels.

FIG. 2 shows an example of the structure of the illumination device IL and the display panel PNL applicable to the present embodiment. In the example depicted, a first direction X, second direction Y, and third direction Z are orthogonal to each other; however, they may cross at an angle other than 90°. The X-Y plane defined by the first direction X and the second direction Y is substantially parallel to the main surfaces of optical members such as display panel PNL and illumination device IL. The third direction Z corresponds to a layer direction of the illumination device IL and the display panel PNL and a travelling direction of light emitted from the illumination device IL.

In the example depicted, the display panel PNL is a liquid crystal display panel which includes a first substrate SUB1, second substrate SUB2, and liquid crystal layer LC held between the first substrate SUB1 and the second substrate SUB2. A polarizer PL1 is disposed on the rear surface side of the first substrate SUB1. A polarizer PL2 is disposed on the front surface side of the second substrate SUB2. For example, absorption axes of the polarizers PL1 and PL2 are orthogonal to each other in the X-Y plane. Here, the side of the display panel PNL where the illumination device IL is disposed is referred to as the rear surface side, and the opposite side to the rear surface side is referred to as the front surface side.

The display panel PNL includes a display area DA on which an image is displayed. The display panel PNL includes a plurality of pixels PX arranged in a matrix in the first and second directions X and Y within the display area DA. A pixel PX includes, for example, first subpixel SPX1, second subpixel SPX2, and third subpixel SPX3. The first subpixel SPX1 includes, for example, a red color filter to display red. The second subpixel SPX2 includes, for example, a green color filter to display green. The third subpixel SPX3 includes, for example, a blue color filter to display blue.

The first substrate SUB1 includes scan lines GL (gate lines) and signal lines SL (data lines or source lines) crossing the scan lines GL. Each scan line GL extends to the outside of the display area DA to be connected to the scan circuit 42. Each signal line GL extends to the outside of the display area DA to be connected to the signal output circuit 41. Both the scan circuit 42 and the signal output circuit 41 are controlled by the image data used to the image display on the display area DA.

Each subpixel includes a switching element SW (for example, thin film transistor), pixel electrode PE, and common electrode CE. The switching element SW is electrically connected to the scan line GL and the signal line SL. The pixel electrode PE is electrically connected to the switching element SW. The common electrode CE is opposed to a plurality of pixel electrodes PE. The pixel electrode PE and common electrode CE are function as a driver electrode which drives the liquid crystal layer LC. The pixel electrode PE and the common electrode CE are formed of a transparent conductive material such as indium tin oxide (ITO) or indium zinc oxide (IZO).

The illumination device IL is disposed on the rear surface of the display panel PNL and emits light to the display panel PNL. The illumination device IL includes an illumination area IA opposed to the display area DA. The illumination device IL includes a light source LS arranged in a matrix in the illumination area IA. The light source LS is, for example, a light emitting diode which emits white light; however, no limitation is intended thereby. As a light source LS emitting white light may be a one-chip light emitting diode which emits red, green, and blue, or a combination of blue or near-ultraviolet light emitting diode and a fluorescence. Such a light source LS can control the brightness depending on the amount of current supplied.

For example, one light source LS is disposed to be opposed to a sub display area including m×n pixels PX. Note that m and n are positive integers where m is the number of the pixels PX aligned in the first direction X and n is the number of the pixels PX aligned in the second direction Y. Each light source LS can be turned on/off individually. Thus, the illumination device IL can form a sub illumination area which can be turned on/off individually in the illumination area IA. The sub illumination area includes at least one light source LS. The sub illumination area can be formed as various shapes such as a band-like shape extending in the first direction X, or a band-like shape extending in the second direction Y, or a matrix arranged in the first and second directions X and Y in the X-Y plane.

Now, a local dimming control will be explained.

Figure 3:
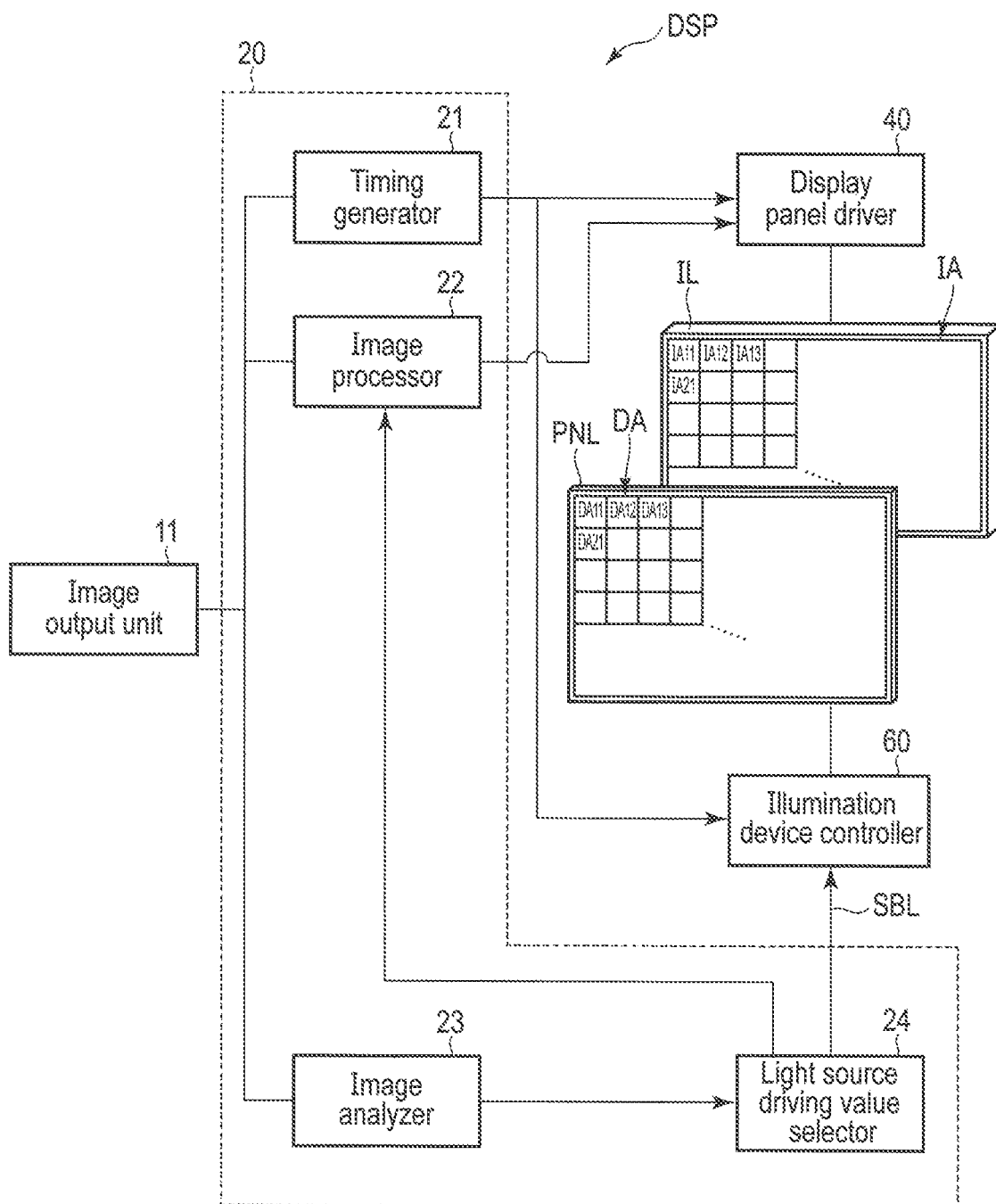
FIG. 3 is a block diagram showing an example of the structure of the display device to which a local dimming control is applied.

FIG. 3 is a block diagram showing an example of the structure of the display device DSP to which the local dimming control is applied.

The illumination device IL includes sub illumination areas IA11, IA12, . . . arranged in a matrix within the illumination area IA. The display panel PNL includes sub display areas DA11, DA12, . . . arranged in a matrix within the display area DA. As explained with reference to FIG. 2, each sub illumination area comprises one or more light sources. Each sub display area is opposed to the corresponding sub illumination area and includes m×n pixels PX. The brightness of the sub illumination area can be controlled on the basis of the current value supplied to the light source. Thus, by changing the current value of the light source of each sub illumination area, the brightness thereof can be changed. Light emitted from each sub illumination area illuminates the corresponding sub display area. Thus, in the display area DA, the brightness of the sub illumination areas which illuminate the sub display areas including low gradation pixels is set low, and the brightness of the sub illumination areas which illuminate the sub display areas including high gradation pixels is set high. Thereby, the contrast ratio of the image displayed in the display area DA can be improved.

Now, an example of the control will be explained briefly. As shown in FIG. 1, an input signal SGI as the data of the image to be displayed is input in the signal processor 20 from the image output unit 11. The signal processor 20 includes a timing generator 21, image processor 22, image analyzer 23, and light source driving value selector 24.

The timing generator 21 synchronizes the image displayed by the display panel PNL and the drive of the illumination device IL. That is, the timing generator 21 processes the input signal SGT to send a signal used for the timing synchronization of the display panel PNL and the illumination device controller 60 by each frame to the display panel driver 40 and the illumination device controller 60.

The image processor 22 performs processes to display an image on the display panel PNL on the basis of the drive of the illumination device IL. That is, the image processor 22 processes the input signal SGI to generate an output signal used to determine the display gradation of each of the first to third sub pixels and processes the display data to be output to the display panel driver 40 in order to display the image corresponding to the drive of the light source. The image analyzer 23 processes the input signal SGI to analyze the image displayed in sub illumination areas IA11, IA12, . . . individually. The light source driving value selector 24 selects a driving value of each light source on the basis of the data analyzed by the image analyzer 23, sends the data of the brightness of each sub pixel to the image processor 22, and controls the illumination device controller 60.

FIG. 4 is a perspective view of the display device DSP of the present embodiment in a disassembled manner.

The illumination device IL is disposed in the rear surface side of the display panel PNL. The illumination device IL includes light sources LS, a partition PT disposed between the light sources LS and the display panel PNL, and a light diffusing layer DP disposed between the partition PT and the display panel PNL. The light sources LS are arranged in a matrix in the first and second directions X and Y. The light sources LS are each mounted on a circuit substrate LFPC.

The partition PT includes light guides LG which guide the light from each light source LS to the light diffusing layer DP. The light guides LG are formed in a matrix in the first and second directions X and Y to be opposed to the light sources LS. One light guide LG is opposed to one light source LS. Here, one light source LS includes at least one light emitting element such as light emitting diode (LED).

Now, the structure of the light guides LG will be explained with reference to one thereof.

A light guide LG includes an opening OP1 opposed to a light source LS, opening OP2 opposed to the light diffusing layer DL, and side surfaces P10 surrounding the light source LS. In the example depicted, the light guide LG includes four side surfaces P10 surrounding one light source LS. Furthermore, each of the openings OP1 and OP2 is quadrangular and the area of opening OP1 is less than that of opening OP2. Note that, for example, the area of opening OP1 is equal to or more than the area of light source LS, and the shape of opening OP1 is arbitrarily determined to conform to the outer shape of light source LS. Thus, the light source LS is fit in the opening OP1. Such a light guide LG is formed in a frustum expanding from the light source LS to the light diffusing layer DP.

Note that, in this example, the number of side surfaces P10 surrounding one light source LS is four; however, no limitation is intended thereby. Furthermore, the shape of each of the openings OP1 and OP2 is a square; however, it may be a circle, ellipse, or any other polygonal shape.

Figure 5:
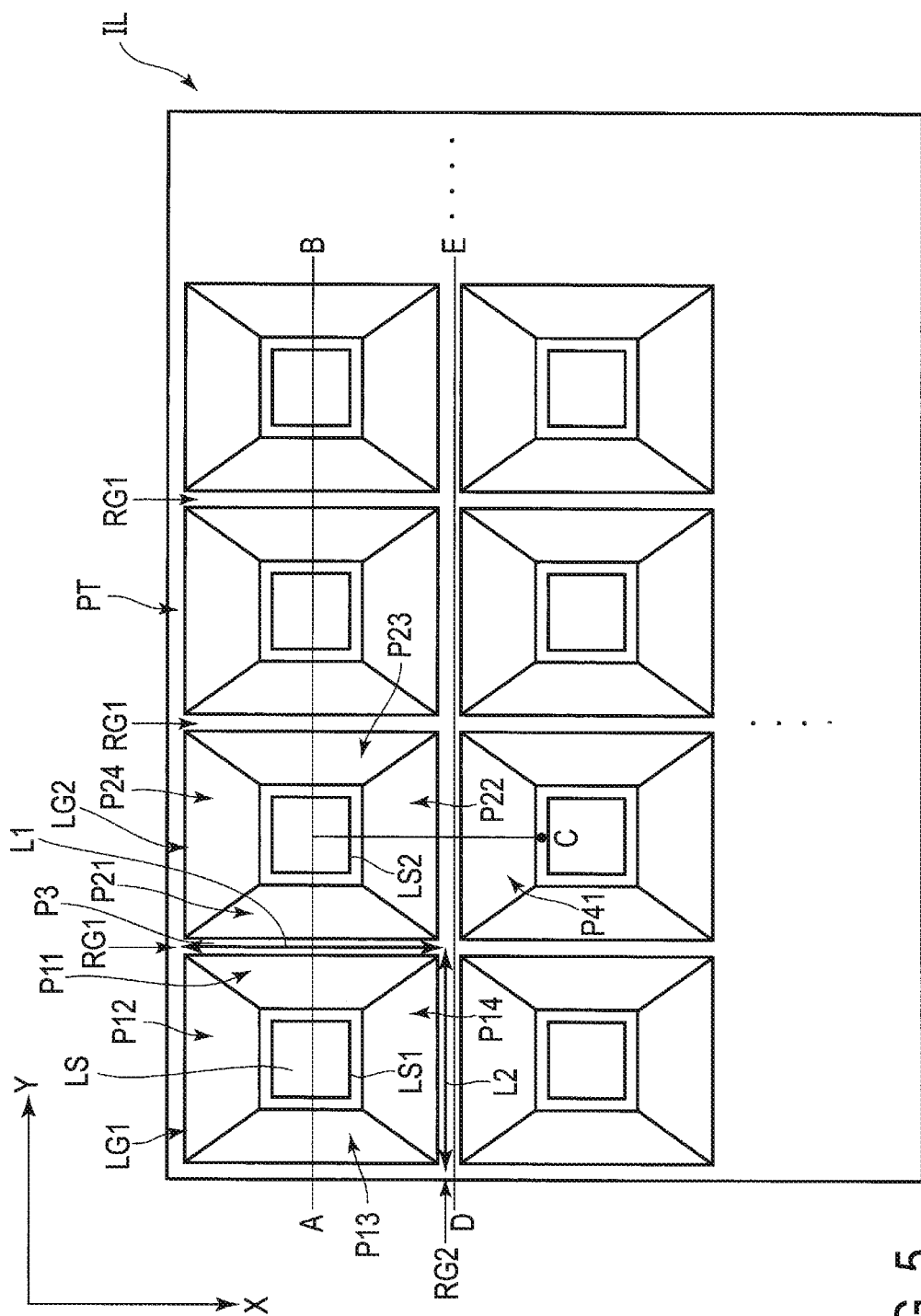
FIG. 5 is a plan view showing an example of the structure of a partition PT applied to an illumination device of FIG. 4.

FIG. 5 is a plan view showing an example of the structure of the partition PT applied to the illumination device IL of FIG. 4.

Here, the structure of the partition PT will be explained with reference to the light guides LG1 and LG2 corresponding to the light sources LS1 and LS2. The partition PT includes side surfaces P11 to P14 surrounding a light source LS1, side surfaces P21 to P24 surrounding a light source LS2, and connector P3 connecting the side surface P11 and P21. The side surfaces P11 and P21 are arranged in the second direction Y. That is, the connector P3 is a connector of one side surface P11 of the four side surfaces P11 to P14 and one side surface P21 of the four side surfaces P21 to P24.

The partition PT includes, in a plan view, a ridge RG1 extending in the first direction X and a ridge RG2 extending in the second direction Y. One ridge RG1 continuously extends from one end to the other end of the partition PT in the first direction X. Furthermore, one ridge RG2 continuously extends from one end to the other end of the partition PT in the second direction Y. The ridges RG1 and RG2 cross each other in a lattice. The connector P3 is disposed in the ridge RG1.

Referring to a part of the ridges RG1 and RG2 surrounding the light source LS1, the ridge RG1 has a length L1 in its part corresponding to the light source LS1 and the right RG2 has a length L2 in its part corresponding to the light source LS1. The lengths L1 and L2 may be equal or may be different. In the example depicted, the length L1 is greater than the length L2; however, the length L2 may be greater than the length L1.

Note that the light sources LS1 and LS2 correspond to, for example, sub display areas DA11 and DA12 shown in FIG. 3. Here, each of the light sources LS1 and LS2 is turned on/off with the brightness corresponding to the gradation value of the image data used to drive the sub display areas DA11 and DA12 in synchronization with the image display on the sub display areas DA11 and DA12.

Figure 6:
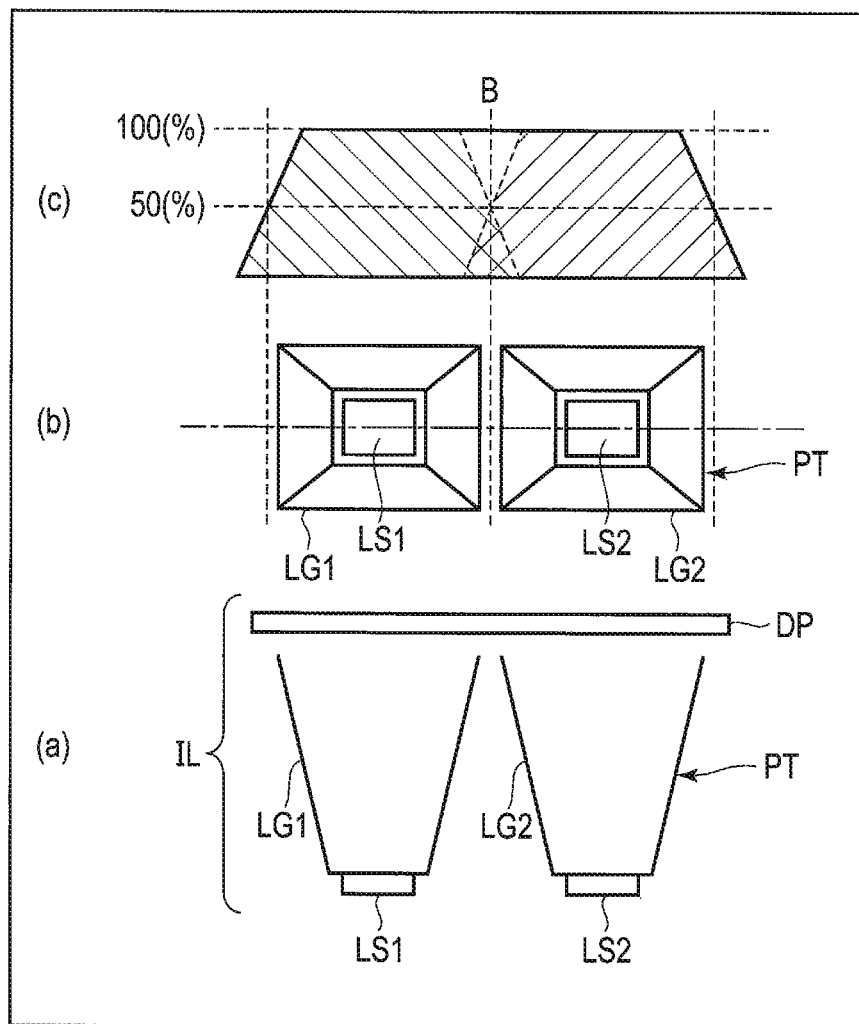
FIG. 6 shows the distribution of the brightness when adjacent light sources are turned on at the same time in the illumination device.

FIG. 6 shows the distribution of the brightness when adjacent light sources are turned on at the same time in the illumination device IL. FIG. 6(a) is a schematic cross-sectional view including the light sources LS1 and LS2, partition PT, and light diffusing layer DP, FIG. 6(b) is a schematic cross-sectional view including the light sources LS1 and LS2 and the partition PT, and FIG. 6(c) schematically shows the distribution of the brightness of the light passing the light diffusing layer DP when the light sources LS1 and LS2 are turned on at the same time.

The distribution of the brightness when the light source LS1 alone is turned on is depicted by a hatch of lines slanting to right in the figure, and the brightness becomes substantially even in the proximity of the center where the position immediately above the light source LS1 is included and gradually decreases when closing to the proximity of the boundary B between the light sources LS1 and LS2. In the example depicted, given that the brightness in the proximity of the center is 100%, the brightness becomes 50% in the proximity of the boundary B. The distribution of the brightness when the light source LS2 alone is turned on is depicted by a hatch of lines slanting to the left in the figure, and the brightness changes in the same manner as the light source LS1. Thus, the distribution of the brightness when the light sources LS1 and LS2 are turned on at the same time is depicted as in the part surrounded by the solid line in the figure, and substantially 100% brightness can be obtained not only in the parts immediately above the light sources LS1 and LS2 but also in the boundary B, and the distribution of the brightness can be achieved uniformly. Therefore, when the light sources LS1 and LS2 are turned on at the same time, the distribution of the brightness as depicted is desirable.

On the other hand, as to the distribution of the brightness of each of the light sources LS1 and LS2, if the brightness in the proximity of the boundary B is less than 50%, when the light sources LS1 and LS2 are turned on at the same time, the brightness becomes less than 100% in the proximity of the boundary B, and as a result, a dim line of low brightness appears in the boundary B.

Furthermore, as to the distribution of the brightness of each of the light sources LS1 and LS2, if the brightness in the proximity of the boundary B is more than 50%, when the light sources LS1 and LS2 are turned on at the same time, the brightness becomes more than 100% in the proximity of the boundary B, and as a result, a bright line of high brightness appears in the boundary B.

The distribution of the brightness of each light source differs depending on conditions such as an angle of light exiting from the light source, position and height of each light guide LG, and aspect ratio in the X-Y plane. Furthermore, in an light source array in which some light sources LS, the brightness in the proximity of adjacent light sources LS differs depending on conditions such as distribution of the brightness of each light source, gap between adjacent light sources, gap between adjacent light guides LG. Thus, in order to achieve even distribution of the brightness in the X-Y plane of the illumination device IL, or 50% brightness in the proximity of the boundary B, various design restrictions must be considered.

For example, in the illumination device IL of FIG. 5, a dim line or a bright line may appear immediately above the ridges RG1 and RG2, or a dim line may appear immediately above either one of the ridges RG1 and RG2 and a bright line may appear immediately above the other. In order to suppress such unevenness in the brightness, the present embodiment adopts following structural examples.

Figure 7:
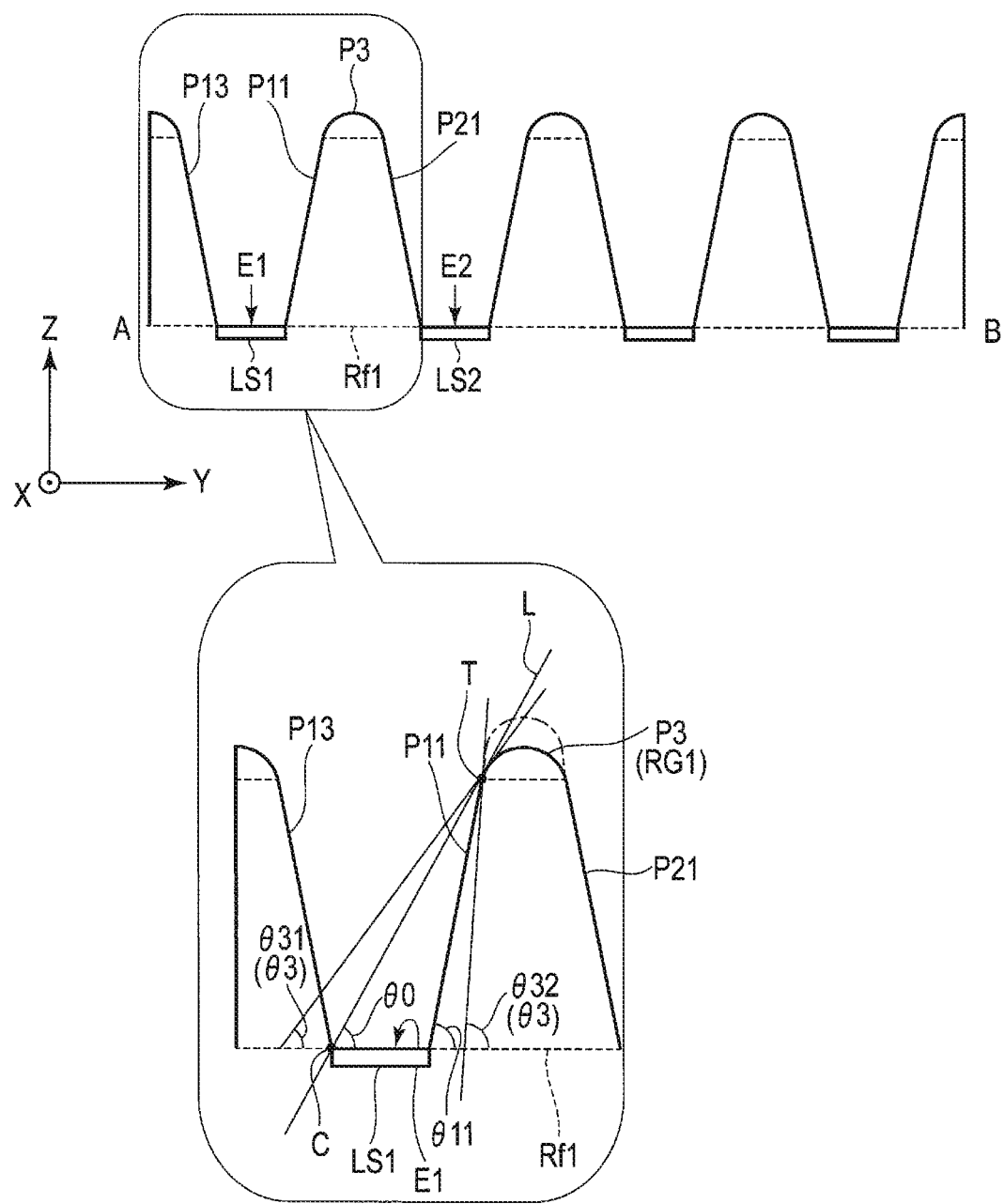
FIG. 7 is a cross-sectional view of an example of the structure of a partition, taken along line A-B of FIG. 5.

FIG. 7 is a cross-sectional view of an example of the structure of the partition PT, taken along line A-B of FIG. 5. In the example depicted, the connector P3 is formed of curved surfaces. Note that the curved surfaces may be ellipse surfaces, paraboloid surfaces, spherical surfaces, or non-spherical surfaces. The side surfaces P11 and P21 are flat surfaces. Here, given that a surface parallel to the X-Y plane including exiting surfaces E1 and E2 of the light sources LS1 and LS2 is a reference surface Rf1, the side surfaces P11 and P21 are inclined surfaces with respect to the reference surface Rf1. For example, an inclination angle θ11 of the side surface P11 corresponds to an angle formed by the side surface P11 and the reference surface Rf1 and is an acute angle. On the other hand, an inclination angle θ31 of the connector P3 corresponds to an angle formed by a tangential line of the connector P3 and the reference surface Rf1 and is an acute angle. The inclination angle θ11 is different from the inclination angle θ31. As being depicted by solid lines in the figure, the inclination angle θ11 of the side surface P11 is greater than the inclination angle θ31 of the connector P31. As being depicted by dotted lines in the figure, the inclination angle θ11 of the side surface P11 is less than the inclination angle θ32 of the connector P3. Here, angle θ0 formed by a line L connecting the top T of the side surface P11 and the bottom C of the side surface P13 and the reference surface Rf1 is less than the inclination angle θ11. Furthermore, the angle θ0 is greater than the inclination angle θ31 and is less than the inclination angle θ32.

In the example depicted, the side surfaces P11 and P21 and the connector P3 are formed integrally. The side surfaces P11 and P21 and the connector P3 are formed of the same material and form reflective surfaces having substantially equal reflectivity. Such reflective surfaces can be formed of a metal layer or a resin layer of color of high reflectivity such as white. Note that, for example, a hollow space is provided between the side surfaces P11 and P21; however, no limitation is intended thereby. For example, a cross-sectional shape of the wall may have the side surfaces P11 and P21 and the connector P3, and in that case, the wall may be formed of a highly reflective metal or resin or a highly reflective metal or resin layer may be provided with the surface of the wall. Furthermore, the side surfaces P11 and P12 and the connector P3 may be formed of different materials, and in that case, the reflectivity of the side surfaces P11 and P21 may differ from that of the connector P3.

In this embodiment, the connector P3 connecting the side surfaces P11 and P21 adjacent to each other has an inclination angle which is different from that of the side surface P11. For example, in a case where a dim line appears immediately above the ridge RG1 where the connector P3 is disposed, it is effective to set the inclination angle $\theta 31$ greater than the inclination angle $\theta 11$. In such a structural example, the light exiting from substantially the entire area of the exiting surface E1 can be guided to the position immediately above the ridge RG1. Especially, in the exiting surface E1, light emitted from the position in the proximity of the bottom C of the side surface P13 is, as depicted by the line L in the figure, guided to the position immediately above the ridge RG1 without being blocked by the connector P3. Thus, a dim line appearing immediately above the ridge RG1 can be suppressed. Furthermore, the connector P3 with the inclination angle $\theta 31$ formed small is curved as almost a flat surface parallel to the reference surface Rf1. Thus, the light diffused by the light diffusing layer DP is partly diffused toward the connector P3 and is directly reflected to the light diffusing layer DP. Thereby, the appearance of the dim line can be suppressed.

Furthermore, in a case where a bright line appears immediately above the ridge RG1 where the connector P3 is disposed, it is effective to set the inclination angle $\theta 32$ greater than the inclination angle $\theta 11$. In such a structural example, the connector P3 can block a part of the light emitting from the exiting surface E1. Thus, the amount of light guided to the position immediately above the ridge RG1 is decreased and the appearance of bright lines can be suppressed. Furthermore, the connector P3 with the inclination angle $\theta 32$ formed large scatters the light diffused by the light diffusing layer DP. Thereby, the amount of light redirected to the light diffusing layer DP is decreased and the appearance of the bright line can be suppressed.

Therefore, the illumination device IL of the present embodiment can suppress unevenness of the brightness. Furthermore, the display device DSP with the illumination device IL of the present embodiment can suppress degradation in the display quality caused by the unevenness of the brightness of the illumination device IL.

Figure 8:
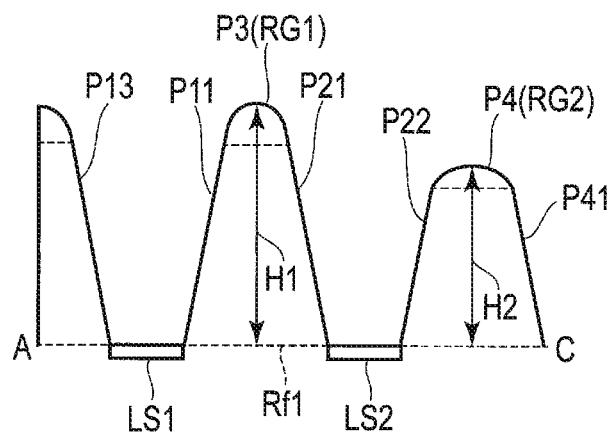
FIG. 8 is a cross-sectional view of an example of the structure of the partition, taken along line A-C of FIG. 5.

FIG. 8 is a cross-sectional view of an example of the structure of the partition PT, taken along line A-C of FIG. 5. In the example depicted, the ridges RG1 and RG2 have different cross-sectional shapes. In the example depicted, the ridge RG1 has a cross-sectional shape of the connector P3 connecting the side surfaces P11 and P21, and the ridge RG2 has a cross-sectional shape of the connector P4 connecting the side surfaces P22 and P41. The ridge RG1 has a height H1 measured from the reference surface Rf1 and the ridge RG2 has a height H2 measured from the reference surface Rf1, where the height H1 is different from the height H2. In the example depicted, the height H1 is greater than the height H2. Furthermore, the connector P3 forming the ridge RG1 is, as depicted by dotted lines in FIG. 7, used in a case where the inclination angle $\theta 32$ is greater than the inclination angle $\theta 11$, and the connector P4 forming the ridge RG2 is, as being depicted by solid lines in FIG. 7, used in a case where the inclination angle $\theta 31$ is less than the inclination angle $\theta 11$. The curvature of the connector P3 or P4 and the height of the ridge RG1 or RG2 may be set as needed according to the ratio between the length L1 and the length L2 and/or the shape of the light guides LG.

As shown in FIG. 5, in the structure where the ridges RG1 and RG2 surrounding their light sources have different parts lengths, the degree of expansion of light in the first direction X and the degree of expansion of light in the second direction Y may differ, and there may be a case where a dim line may appear in either one of the boundary between light sources adjacent in the first direction X and the boundary between light sources adjacent in the second direction Y, and a bright line may appear in the other. In such a case, the structure of FIG. 8 is effective. For example, in a case where a bright line appears immediately above the ridge RG1 and a dim line appears immediately above the ridge RG2, the connector P3 forming the ridge RG1 blocks and diffuses the light from the light source LS2 to suppress the appearance of bright line, and the connector P4 forming the ridge RG2 guides the light from the light source LS2 to the position immediately above thereof to suppress the appearance of dim line. Thus, the unevenness of brightness can be suppressed.

Figure 9:
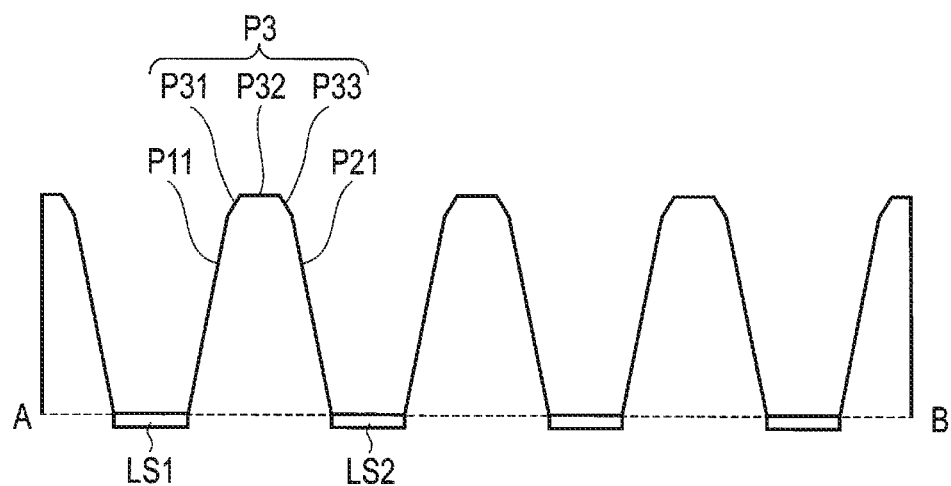
FIG. 9 is a cross-sectional view of another example of the structure of the partition, taken along line A-B of FIG. 5.

FIG. 9 is a cross-sectional view showing another example of the structure of the partition PT, taken along line A-B of FIG. 5. As compared to the structure of FIG. 7, the structure of FIG. 9 includes the connector P3 formed of two or more flat surfaces.

In the example depicted, the connector P3 includes a first surface P31, second surface P32, and third surface P33. The first, second, and third surfaces P31 to P33 are flat surfaces. The first surface P31 is connected the side surface P11 and has an inclination angle which is different from that of the side surface P11. The third surface P33 is connected to the side surface P21 and has an inclination angle which is different from that of the side surface P21. The second surface P32 is connected to the first surface P31 and the third surface P33. The side surfaces P11 and P21 and the connector P3 are formed of the same material and form reflective surfaces having substantially equal reflectivity. Note that the connector P3 may be formed of a material which is not used in the side surfaces P11 and P21 and may have the reflectivity different from that of the side surfaces P11 and P21.

In such a structure, the aforementioned advantages can be achieved.

Figure 10A:
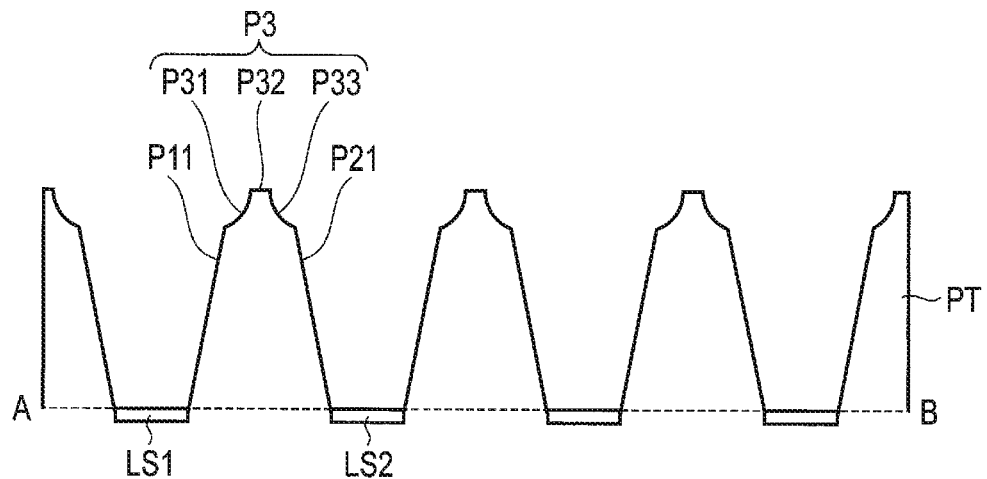
FIG. 10A is a cross-sectional view of another example of the structure of the partition, taken along line A-B of FIG. 5.

FIG. 10A is a cross-sectional view showing another example of the structure of the partition PT, taken along line A-B of FIG. 5. As compared to the example of FIG. 7, the structure of FIG. 10A includes the connector P3 formed of a combination of curved surfaces and flat surfaces.

In the example depicted, the first surface P31 and the third surface P33 are curved surfaces, and the second surface P32 is a flat surface. Note that, as will be explained later, the first surface P31 and the third surface P33 are downward concaved surfaces; however, they may be upward convex surfaces. Furthermore, in the example depicted, the second surface P32 connects the first surface P31 and the third surface P33; however, the first surface P31 and the third surface P33 may be connected directly by omitting the second surface P32.

In such a structure, the aforementioned advantages can be achieved.

Figure 10B:
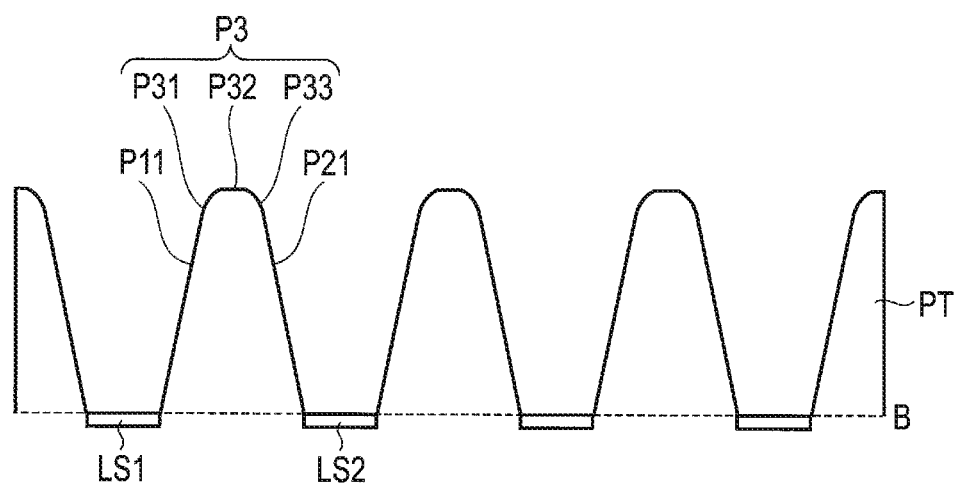
FIG. 10B is a cross-sectional view of another example of the structure of the partition, taken along line A-B of FIG. 5.

FIG. 10B is a cross-sectional view showing another example of the structure of the partition PT, taken along line A-B of FIG. 5. As compared to the example of FIG. 10A, the structure of FIG. 10B includes the first surface P31 and the third surface P33 are upward convex surfaces.

As in the example of FIG. 10A, in the example depicted, the first surface P31 and the third surface P33 are curved surfaces and the second surface P32 is a flat surface. Furthermore, in the example depicted, the second surface P32 connects the first surface P31 and the third surface P33; however, the first surface P31 and the third surface P33 may be connected directly by omitting the second surface P32.

In such a structure, the aforementioned advantages can be achieved.

FIG. 11 is a cross-sectional view of another example of the structure of the partition PT, taken along line A-B of FIG. 5. As compared to the example of FIG. 7, the structure of FIG. 11 includes the partition PT with an optical adjustor DM1.

In the example depicted, the partition PT includes an upper surface US connecting the side surfaces P11 and P21. The upper surface US is a flat surface along the X-Y plane and is opposed to the display panel PNL and the light diffusing layer DP. The optical adjustor DM1 is positioned on the upper surface US. In the example depicted, the optical adjustor DM1 is disposed in the entire surface of the upper surface US. In that case, the connector P3 corresponds to the surface of the optical adjustor DM1 in the side opposed to the display panel PNL, and connects the side surfaces P11 and P21. In the example depicted, the connector P3 corresponds to a curved surface of the optical adjustor DM1. Note that the optical adjustor DM1 may be disposed in a part of the upper surface US.

In the example of FIG. 11, the optical adjustor DM1 is a light diffusing material. For example, the optical adjustor DM1 is formed of a semi-transparent resin material or a resin material in which diffusion bodies are dispersed in a transparent base material. That is, the connector P3 is formed of a light diffusing material. Specifically, the side surfaces P11 and P21 are formed of a material which is different from a material used in the connector P3, and the side surfaces P11 and P21 have reflectivity which is different from that of the connector P3. Furthermore, the optical adjustor DM1 which is a light diffusing material has a haze value which is less than that of the light diffusing layer DP.

As can be understood from the above, the optical adjustor DM1 is disposed in the upper surface US, and thus, light from the light source LS is suitably diffused by entering the optical adjustor DM1 and the appearance of bright line by local light concentration can be suppressed. Furthermore, the light diffused by the light diffusing layer DP enters the optical adjustor DM1 and is suitably scattered. Thereby, the direct reflection on the upper surface US is suppressed, the amount of light redirected to the light diffusing layer DP can be decreased, and the appearance of bright line can be suppressed. Note that the connector P3 may be formed as a rough surface for light diffusion.

FIG. 12 is a perspective view of another example of the structure of the partition PT in a disassembled manner.

In the example of FIG. 12, each of the ridges RG1 and RG2 has a recess CC and a projection CV. The recesses CC of the ridges RG1 and RG2 are disposed at crossing points of the ridges RG1 and RG2.

FIG. 13 is a cross-sectional view of another example of the structure of the partition PT, taken along line D-E of FIG. 5. FIG. 13 shows a cross-sectional view of the ridge RG2, taken along line D-E when the partition PT is formed in the shape shown in FIG. 12, and, in order to clarify their relative positions, the light sources LS1 and LS2, and side surfaces P11 and P13 of the light guide are depicted by dotted lines.

As shown, the ridge RG2 includes the recess CC and projection CV. For example, the projection CV projects the most at a mid-position between adjacent recesses CC and is close to the light diffusing layer DP. Note that, although the cross-sectional view of the ridge RG2 will be explained here; the cross-sectional view of the ridge RG1 is the same.

As can be understood from the above, the recess CC formed at the crossing point of the ridges RG1 and RG2, and thus, the light from each light source reaches the position directly above the crossing point, and the appearance of dim line can be suppressed.

FIG. 14 is a cross-sectional view of another example of the structure of the partition PT, taken along line A-B of FIG. 5. As compared to the example of FIG. 11, the structure of FIG. 14 has a different optical adjustor DM2.

The optical adjustor DM2 is disposed on the upper surface US. In the example depicted, the optical adjustor DM2 is a sheet extending from the upper surface US to the position opposed to the light sources LS1 and LS2. In the example depicted in FIG. 14, the optical adjustor DM2 is a light diffusing material. Furthermore, the optical adjustor DM2 which is a light diffusing material has a haze value which is less than that of the light diffusing layer DP.

With the optical adjustor DM2 as a sheet, the light from the light source LS propagates within the optical adjustor DM2 and is diffused to the upper surface US of the partition PT. That is, the light is guided to the position where a dim line may appear and the light is diffused in the position where a bright line may appear. In addition, since the optical adjustor DM2 has a haze value which is less than that of the light diffusing layer DP, the direct reflection by the upper surface US can be suppressed. Thus, unevenness in the brightness in the ridges RG1 and RG2 can be suppressed.

FIG. 15 is a cross-sectional view of another example of the structure of the partition PT, taken along line A-B of FIG. 5. As compared to the example of FIG. 11, the structure of FIG. 15 includes a different optical adjustor DM3.

The optical adjustor DM3 is disposed in the upper surface US and does not extend in the position opposed to the light sources LS1 and LS2. In the example of FIG. 15, the optical adjustor DM3 is a light diffusing material. Here, the optical adjustor DM3 includes the first surface P31, second surface P32, and third surface P33 as the connector P3; however, as in the optical adjustor DM1 of FIG. 11, the connector P3 may be a curved surface. That is, the connector P3 is formed of a light diffusing material. Specifically, the side surfaces P11 and P21 are formed of a material which is different from a material used in the connector P3, and the side surfaces P11 and P21 have reflectivity which is different from that of the connector P3. Furthermore, the optical adjustor DM3 which is a light diffusing material has a haze value which is less than that of the light diffusing layer DP.

With the above structure, the same advantages explained with reference to FIG. 14 can be achieved.

FIG. 16 is a cross-sectional view of another example of the structure of the partition PT, taken along line A-B of FIG. 5. As compared to the example of FIG. 15, the structure of FIG. 16 includes a different optical adjustor DM4.

In the example of FIG. 16, the optical adjustor DM4 is a light diffusing material. For example, the optical adjustor DM4 is formed of a black resin material or a material reflectivity of which is lower than that of the upper surface US. Furthermore, in the example depicted, the optical adjustor DM2 is disposed in the entire surface US; however, it may be disposed in a part of the upper surface US. Furthermore, the optical adjustor DM4 includes the first surface P31, second surface P32, and third surface P33 as the connector P3; however, as in the optical adjustor DM1 of FIG. 11, the connector P3 may be a curved surface. That is, the connector P3 is formed of a light absorbing material. That is, the side surfaces P11 and P21 are formed of a material which is different from that of the connector P3 and the reflectivity of the side surfaces P11 and P21 is different from that of the connector P3.

With the optical adjustor DM4 as a light absorbing material disposed in the upper surface US, the optical adjustor DM4 absorbs the light and the appearance of bright line in the ridges RG1 and RG2 can be suppressed.

Figure 17:
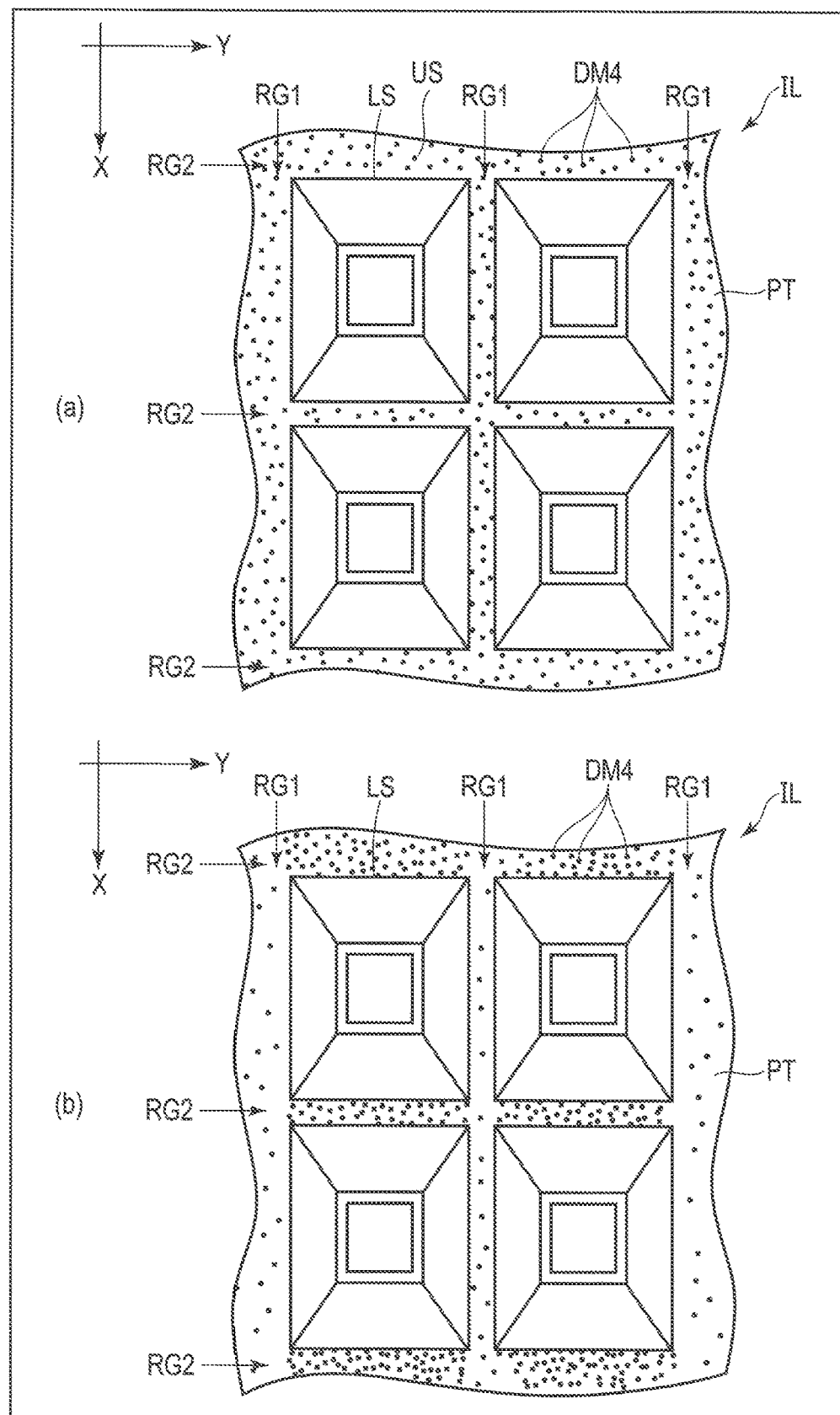
FIG. 17 is a plan view of an example of the arrangement of an optical adjustor in ridges.

FIG. 17 is a plan view showing another example of the arrangement of the optical adjustor DM4 in the ridges RG1 and RG2. In the example of the arrangement of FIG. 17, the optical adjustor DM4 is formed as dots.

The upper surface US of the partition PT includes, in a plan view, the ridge RG1 extending in the first direction X and the ridge RG2 extending in the second direction Y. The ridges RG1 and RG2 cross each other in a lattice.

In the example depicted, the optical adjustor DM4 is arranged as dots in the upper surface US. In FIG. 17(a), dots of the optical adjustor DM4 are arranged in the ridges RG1 and RG2 in even density. In FIG. 17(b), dots of the optical adjustor DM4 are arranged tightly in the ridge RG2 as compared to the ridge RG1 and the crossing point of the ridges RG1 and RG2.

As explained with reference to FIG. 16, the optical adjustor DM4 is formed of a light absorbing material. Thus, in a position where a bright line may appear, the optical adjustor DM4 as dots should be arranged in a tighter manner, and in a position where a dim line may appear, the optical adjustor DM4 should not be arranged. In consideration of such a case, the optical adjustor DM4 as dots may be disposed in at least one of the ridges RG1 and RG2.

For example, in the example of FIG. 17(b), a bright line tends to appear in the ridge RG2 between light sources LS adjacent to each other in the first direction X than in the ridge RG1 between light sources LS adjacent to each other in the second direction Y, and dots of tighter density are arranged in the ridge RG2 than are in the ridge RG1.

Furthermore, if there is gradation in the distribution of brightness in the ridges RG1 and RG2, the optical adjustor DM4 should preferably be arranged to sequentially vary the density of dots. That is, the optical adjustor DM4 formed as dots may have periodically different densities.

For example, as in FIG. 17(b), the dot density on the ridge RG2 along the second direction Y becomes less in the crossing point with the ridge RG1 and becomes more between light sources LS adjacent to each other in the first direction X.

In such an example of arrangement, the advantages explained with reference to FIG. 16 can be achieved.

Figure 18:
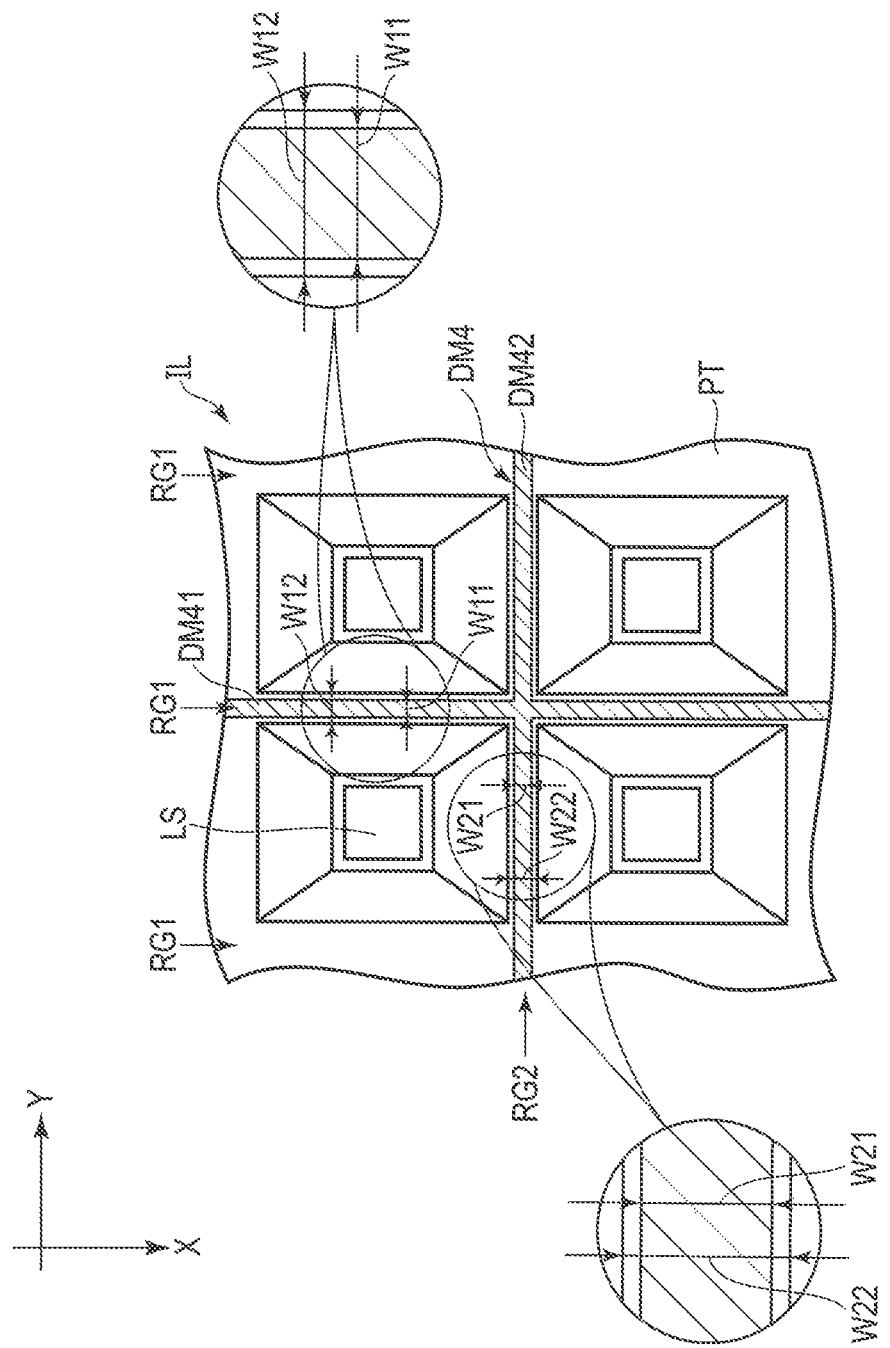
FIG. 18 is a plan view of another example of the arrangement of the optical adjustor in the ridges.

FIG. 18 is a plan view of another example of the arrangement of the optical adjustor DM4 in the ridges RG1 and RG2.

In the example depicted, the optical adjustor DM4 is arranged as stripes. The optical adjustor DM4 includes a first part DM41 and a second part DM42 as stripes. The first part DM41 extends in the first direction X and is arranged in the ridge RG1. The second part DM42 extends in the second direction Y and is arranged in the ridge RG2. In the example depicted, the first part DM41 has a width W11 along the second direction Y which is less than a width W12 of the ridge RG1 in the second direction Y; however, it may be set to be equal to or less than the width W12 of the ridge RG1. Similarly, the second part DM42 has a width W21 along the first direction X which is less than a width W22 of the ridge RG1 in the first direction X; however, it may be set to be equal to or less than the width W22 of the ridge RG2. The first part DM41 and the second part DM42 cross each other at the crossing points of the ridges RG1 and RG2.

Note that, the optical adjustor as stripes may be disposed in at least one of the ridge RG1 and ridge RG2. Furthermore, in the example depicted, one optical adjustor DM4 is arranged in each of the ridges RG1 and RG2; however, several optical adjustors DM4 may be arranged. Furthermore, the first part DM41 and the second part DM42 each extend in parallel to the ridges RG1 and RG2; however, they may extend in directions different from the first direction X and the second direction Y. The area, number, and extending direction of the optical adjustor DM4 in each of the ridges RG1 and RG2 can be changed arbitrarily depending on required suppressing effects of the bright line. In the example illustrated, one optical adjustor is provided on one ridge, but a plurality of optical adjustors may be provided on one ridge.

Figure 19:
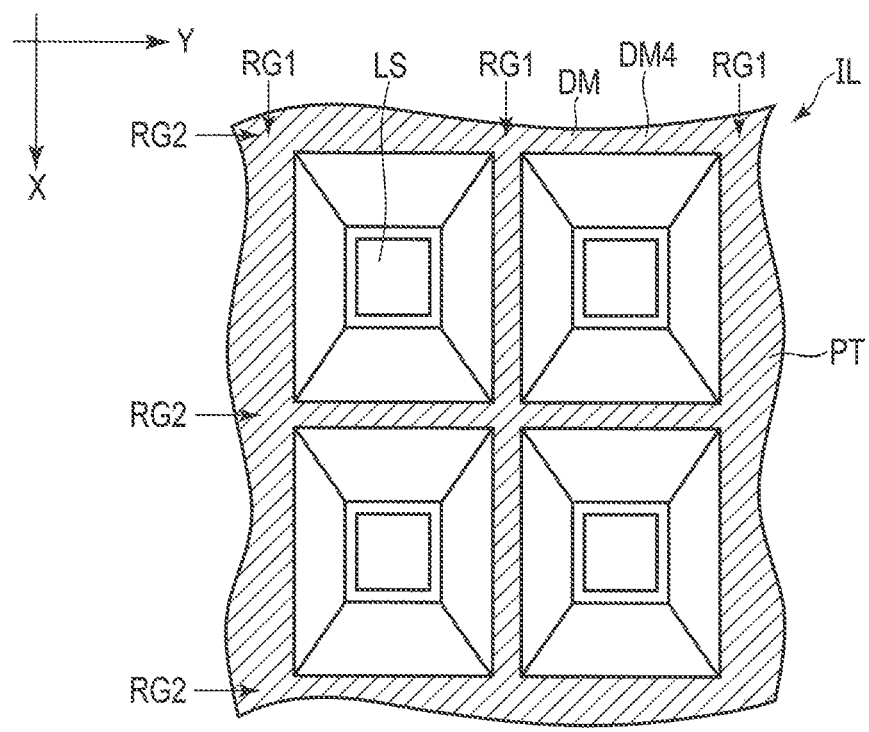
FIG. 19 is a plan view of another example of the arrangement of the optical adjustor in the ridges.

FIG. 19 is a plan view of another example of the arrangement of the optical adjustor DM4 in the ridges RG1 and RG2.

In the example depicted, the optical adjustor DM4 is arranged in the entire surface of the ridges RG1 and RG2. Thus, the appearance of bright line can be suppressed in the entire surface of the ridges RG1 and RG2.

Figure 20:
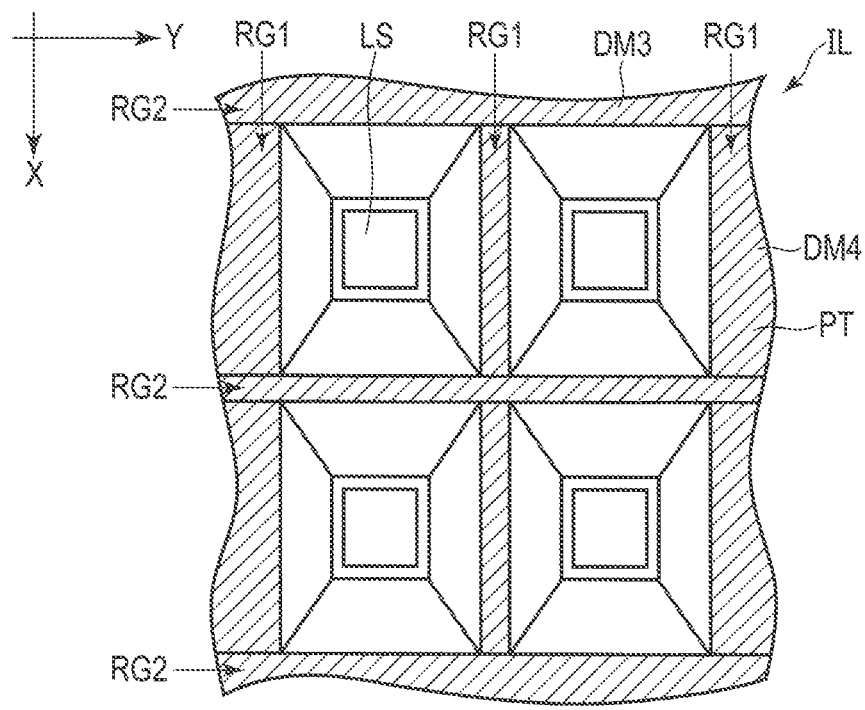
FIG. 20 is a plan view of another example of the arrangement of the optical adjustor in the ridges.

FIG. 20 is a plan view of another example of the arrangement of the optical adjustors DM3 and DM4 in the ridges RG1 and RG2. The optical adjustor DM3 is depicted as a left-down hatch and the optical adjustor DM4 is depicted as a right-down hatch.

The optical adjustor DM3 is disposed in the ridge RG2. The optical adjustor DM4 is disposed in the ridge RG1. As can be understood from the above, depending on purposes such as suppressing the appearance of bright line or suppressing the appearance of dim line in the ridges RG1 and RG2, different optical adjustors can be arranged in the ridges RG1 and RG2.

Note that the above-described optical adjustors DM1 to DM3 may be arranged in at least one of the ridges RG1 and RG2 as with the optical adjustor DM4.

Furthermore, as shown in FIGS. 11 and 14 to 20, in the structure where an optical adjustor is arranged in the upper surface US, the optical adjustor may be adhered to the upper surface US or may be mounted thereon. For example, if the optical adjustor is a sheet, the sheet may have a rough surface to be opposed to the display panel PNL or may have a hole structure. Furthermore, the optical adjustor may be formed in the upper surface US through methods such as coating, deposition, or plating.

Figure 21:
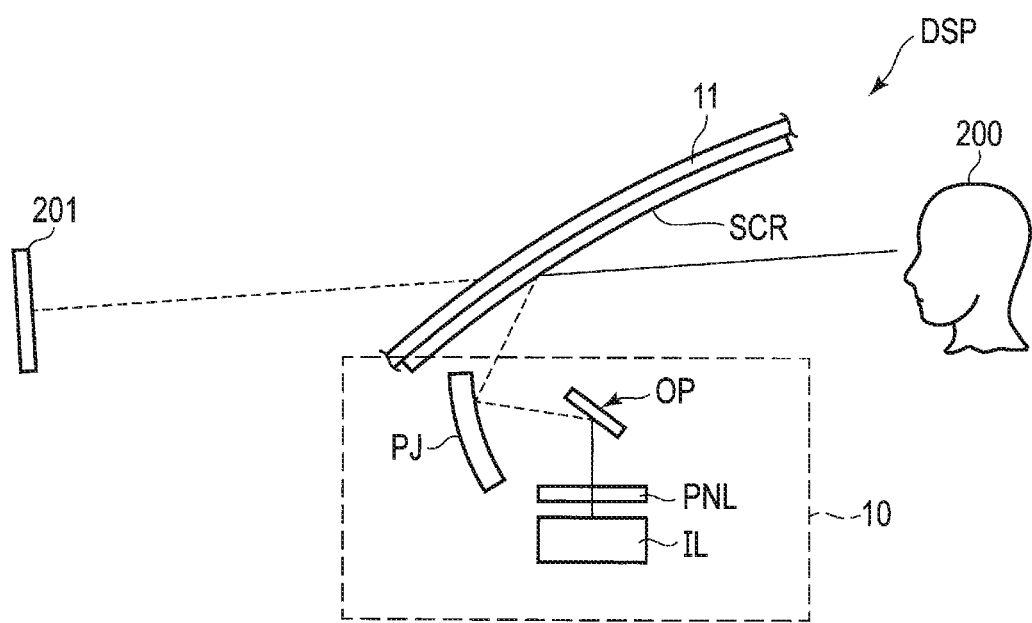
FIG. 21 is an example of the application of the display device of the embodiment.

In FIG. 21, an example of the application of the display device DSP in the present embodiment is shown. In the example depicted, the display device DSP is a head up display using a windshield of a vehicle as an image projection screen SCR. The projection screen SCR is not limited to a windshield and a combiner may be used.

The display device DSP includes an illumination device IL, display panel PNL, optical system OP, and projector PJ.

The illumination device IL includes, as described above, several light sources arranged in the rear surface of the display panel PNL for illuminating the display panel PNL. The details of the illumination device IL and the display panel PNL are explained above and the explanation thereof is omitted.

The optical system OP includes one or more mirrors which lead light (display light) from the display panel PNL to the projector PJ. The projector PJ projects the light led by the optical system OP to the projection screen SCR. As such a projector PJ, a concave mirror is applicable.

As described above, the controller 10 drives the display panel PNL on the basis of the image data and displays an image in the display area DA. The controller 10 selects necessary brightness in each sub illumination area to turn on the light sources of the sub illumination areas with predetermined brightness. Thereby, a user 200 using the display device DSP can recognize a virtual image 201 in front of the projection screen SCR.

As can be understood from the above, the present embodiment can present a display device which can suppress degradation in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
a first light source;
a second light source; and
a partition arranged between the first light source and the second light source, wherein
the partition includes a first side surface facing the first light source, a second side surface facing the second light source, a connector which connects the first side surface and the second side surface and is parallel to a display panel as seen in a cross section perpendicular to a main surface in the display panel, and an optical adjustor which is positioned on the connector to diffuse or absorb light,
the optical adjuster has three sides, including a first side, a second side, and a third side, the first and second sides are provided opposite each other, and the third side is provided between the first and second sides and is parallel to the connector and display panel,
a base of the partition is positioned in between the first and second light sources, and
the first side surface extends away from the first and second light sources at a first angle and the second side surface extends away from the first and second light sources at a second angle different form the first angle, such that as the partition extends away from the first and second light sources, the first and second side surfaces of the partition become closer to each other, and a distance between the first and second sides of the optical adjuster is less than a distance between edges at the base of the first and second side surfaces of the partition.

2. The illumination device of claim 1, wherein
the optical adjustor is in contact with the connector.

3. The illumination device of claim 1, wherein
the optical adjustor is a light absorbing material.

4. The illumination device of claim 1, wherein
the optical adjustor is a light diffusing material.

5. The illumination device of claim 1, further comprising a light diffusing layer positioned between the partition and the display panel, wherein a haze value of the optical adjustor is less than that of the light diffusing layer.

6. The illumination device of claim 1, wherein the optical adjustor is a sheet extending from an upper surface to positions opposed to the first light source and the second light source.

7. The illumination device of claim 1, wherein
the optical adjustor is a light absorbing material or a light diffusing material.

8. The illumination device of claim 7, wherein
a plurality of light sources are partitioned by a plurality of connectors extending in a first direction and a plurality of connectors extending in a second direction differing from the first direction,
the connectors extending in the first direction are light diffusing materials, and
the connectors extending in the second direction are light absorbing materials.

9. A display device comprising:
a first light source;
a second light source; and
a partition arranged between the first light source and the second light source, wherein
the partition includes a first side surface facing the first light source, a second side surface facing the second light source, a connector which connects the first side surface and the second side surface and is parallel to a display panel as seen in a cross section perpendicular to a main surface in the display panel, and an optical adjustor which is positioned on the connector to diffuse or absorb light,
the optical adjuster has three sides, including a first side, a second side, and a third side, the first and second sides are provided opposite each other, and the third side is provided between the first and second sides and is parallel to the connector and display panel,
a base of the partition is positioned in between the first and second light sources, and
the first side surface extends away from the first and second light sources at a first angle and the second side surface extends away from the first and second light sources at a second angle different form the first angle, such that as the partition extends away from the first and second light sources, the first and second side surfaces of the partition become closer to each other, and a distance between the first and second sides of the optical adjuster is less than a distance between edges at the base of the first and second side surfaces of the partition.

10. The display device of claim 9, wherein
the optical adjustor is a light absorbing material or a light diffusing material,
a plurality of light sources are partitioned by a plurality of connectors extending in a first direction and a plurality of connectors extending in a second direction differing from the first direction,
the connectors extending in the first direction are light diffusing materials, and
the connectors extending in the second direction are light absorbing materials.

11. A head-up display device comprising:
a first light source;
a second light source; and
a partition arranged between the first light source and the second light source, wherein
the partition includes a first side surface facing the first light source, a second side surface facing the second light source, a connector which connects the first side surface and the second side surface and is parallel to a display panel as seen in a cross section perpendicular to a main surface in the display panel, and an optical adjustor which is positioned on the connector to diffuse or absorb light, the optical adjuster has three sides, including a first side, a second side, and a third side, the first and second sides are provided opposite each other, and the third side is provided between the first and second sides and is parallel to the connector and display panel, a base of the partition is positioned in between the first and second light sources, and the first side surface extends away from the first and second light sources at a first angle and the second side surface extends away from the first and second light sources at a second angle different form the first angle, such that as the partition extends away from the first and second light sources, the first and second side surfaces of the partition become closer to each other, and a distance between the first and second sides of the optical adjuster is less than a distance between edges at the base of the first and second side surfaces of the partition.

12. The head-up display device of claim 11, wherein the optical adjustor is a light absorbing material or a light diffusing material.

* * * * *